(12) United States Patent
Fan

(10) Patent No.: US 9,303,785 B2
(45) Date of Patent: Apr. 5, 2016

(54) METHOD FOR CONTROLLING VALVE APPARATUS

(71) Applicant: JDV CONTROL VALVES CO., LTD, Yangmei, Taoyuan County (TW)

(72) Inventor: Yi-Ming Fan, Taoyuan Hsien (TW)

(73) Assignee: JDV CONTROL VALVES CO., LTD, Yangmei, Taoyuan Couty (TW)

( * ) Notice: Subject to any disclaimer, the term of this patent is extended or adjusted under 35 U.S.C. 154(b) by 337 days.

(21) Appl. No.: 13/957,452

(22) Filed: Aug. 2, 2013

(65) Prior Publication Data

US 2015/0034846 A1    Feb. 5, 2015

(51) Int. Cl.
*F16K 3/00* (2006.01)
*F16K 37/00* (2006.01)
*F16K 31/04* (2006.01)

(52) U.S. Cl.
CPC .............. *F16K 37/0083* (2013.01); *F16K 3/00* (2013.01); *F16K 31/046* (2013.01); *Y10T 137/8242* (2015.04)

(58) Field of Classification Search
CPC ..... F16K 37/0083; F16K 31/046; F16K 3/00; Y10T 137/8242
USPC .......... 251/129.04, 129.11–129.13, 326–329; 137/554; 706/405, 45; 324/73.1
See application file for complete search history.

(56) References Cited

U.S. PATENT DOCUMENTS

| | | | | |
|---|---|---|---|---|
| 4,523,286 A * | 6/1985 | Koga | ................. | F16K 37/0083 137/551 |
| 4,816,987 A * | 3/1989 | Brooks | ................ | F16K 31/046 137/487.5 |
| 4,896,101 A * | 1/1990 | Cobb | ................. | F16K 37/0083 324/73.1 |
| 5,109,675 A * | 5/1992 | Hwang | ............... | F16K 37/0041 251/129.04 |
| 5,197,328 A * | 3/1993 | Fitzgerald | ........... | F16K 37/0083 137/487.5 |
| 5,687,098 A * | 11/1997 | Grumstrup | .......... | F16K 37/0083 137/487.5 |
| 6,695,282 B2 * | 2/2004 | Clemens | ............. | F16K 37/0083 251/129.04 |
| 7,107,822 B2 * | 9/2006 | Zachary | .............. | G01M 3/2869 137/312 |
| 8,141,847 B2 * | 3/2012 | Fischer | ..................... | F16K 3/18 137/2 |
| 8,925,580 B2 * | 1/2015 | Olsen | ...................... | F16K 3/312 251/329 |
| 2005/0029476 A1 * | 2/2005 | Biester | .................. | F16K 31/046 251/58 |
| 2009/0121169 A1 * | 5/2009 | Porath | ................. | F16K 37/0091 251/129.04 |
| 2009/0229688 A1 * | 9/2009 | Shirai | ..................... | F16K 51/02 251/326 |
| 2013/0068983 A1 * | 3/2013 | Olsen | ..................... | F16K 3/312 251/329 |

FOREIGN PATENT DOCUMENTS

CN          101815932 B     9/2013
WO     WO 2011149358 A1 * 12/2011

* cited by examiner

*Primary Examiner* — John Bastianelli
(74) *Attorney, Agent, or Firm* — Muncy, Geissler, Olds, & Lowe, P.C.

(57) ABSTRACT

An automatic detecting and repairing wisdom valve apparatus includes a valve having a valve sheet; a valve switch connected to the valve sheet through a stem; a driver connected the valve switch; a position detector for detecting positions of the valve sheet with respect to time; a near field controller connected to the driver and the position detector and has a logic unit and a comparator; the logic unit storing rules for determining valve state; a far end control unit for receiving data about the valve; the far end control unit being monitored by monitoring members; and a fault elimination unit; the fault elimination unit storing rules for eliminating of faults about the valve automatically or reporting the faults to the far end monitoring members to do necessary actions. The comparator compares the position-time track of the valve sheet with the standard track the state of the valve.

10 Claims, 5 Drawing Sheets

METHOD FOR CONTROLLING VALVE APPARATUS

FIELD OF THE INVENTION

The present invention relates to valve monitoring and repairing, and in particular to an automatic detecting and repairing wisdom valve apparatus.

BACKGROUND OF THE INVENTION

In currently industrial usages, pipelines are used for fluid transfer, and thus valves are also widely installed in the pipelines for fluid control.

For control of flow, flow meters are widely installed in the pipelines for measuring the flows passing through the pipelines. Also, the valves are electrically controlled to control the flow. In the prior art, all the messages about flows in the valves are transferred to a control center, which are then monitored by specific members. After specific analysis, a control member transfers flow control messages to a valve drive for driving a valve switch to move the valve gate so as to control the opening of the valve. However, in above mentioned way, people need to adjust the state of the valve and performs some required operations. This way has the defect of manual fault judge and thus some accidents may occur.

Therefore, there is an eager demand for a novel valve control system which can adjust the state of the valve automatically and some simply faults in the valve can be eliminated automatically.

SUMMARY OF THE INVENTION

To achieve above object, the present invention provides an automatic detecting and repairing wisdom valve apparatus, wherein a near field controller is built nearby the valve so as to monitor the valve switch to get the data about the position-time track of the valve gate which is used to compare with standard tracks. Furthermore, a logic unit is provided, which has rules for determining the state of the valve. A fault elimination unit is used to eliminate the fault of the valve by movements of the valve gate. Therefore, the present invention provides a near field automatic maintenance and repairing solutions for the control of a valve without actions from far end controlling members.

To achieve above object, the present invention provides an automatic detecting and repairing wisdom valve apparatus comprising: a valve connected with a pipeline for controlling flow in the pipeline; the valve including a valve gate; movement of the valve gate will control an opening of a flow pass of the pipeline so as to control amount of fluid flowing through the valve; a valve switch connected to the valve gate through a stem; a driver connected the valve switch; the drive being electrically or pneumatic controlled; the driver serving to control the movement of the valve gate and thus to control the opening of the valve gate; a position detector installed in the valve switch for detecting a position of the valve gate with respect to time; a near field controller connected to the driver and the position detector; the near field controller having a logic unit and a comparator; the logic unit storing rules for determining valve state; the comparator being connected to the logic unit; the comparator having a position database; the positions detected by the position detector being recorded in the position database; so as to form as a position-time track for the opening of the valve gate; the position database also storing standard tracks; the standard track being an ideal track for the positions of the valve gate with respect to opening time, which is built in the position database in advance; a far end control unit installed at a position far away from the valve for receiving data about the valve; the far end control unit monitored by monitoring members; and a fault elimination unit; the fault elimination unit storing rules for eliminating of faults about the valve automatically or reporting the faults to the far end monitoring members to do necessary actions.

DETAILED DESCRIPTION OF THE PREFERRED EMBODIMENTS

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
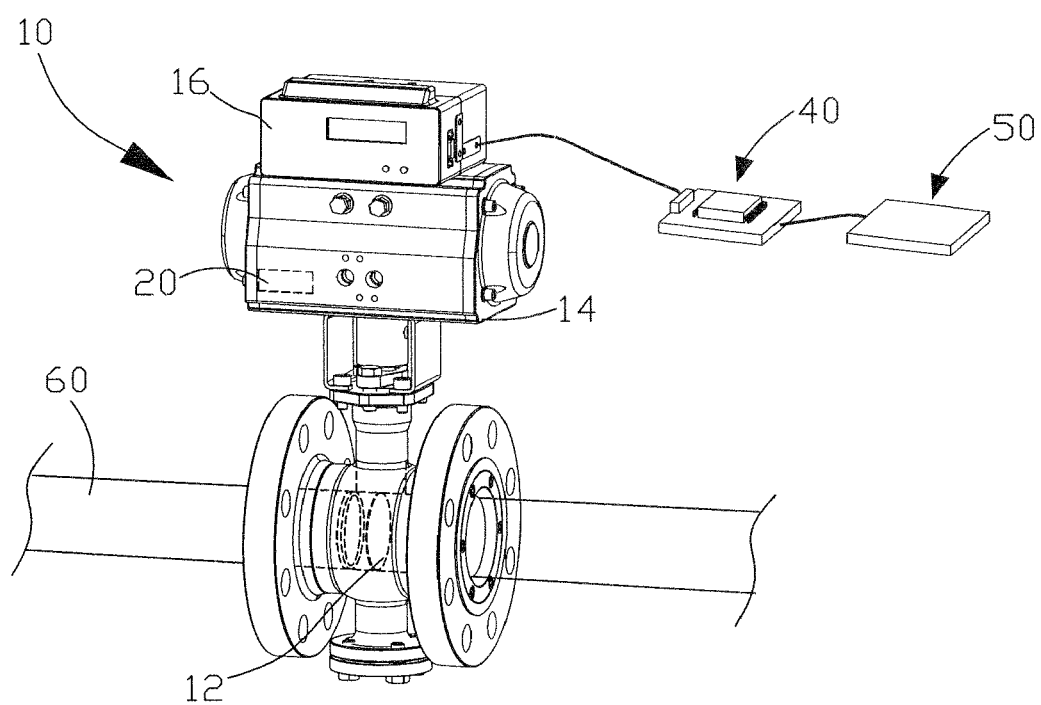
FIG. 1 is a schematic view showing the structure of the present invention.

With reference to FIG. 1, the structure of the present invention will be described herein.

A valve 10 is connected with a pipeline 60 for controlling the flow in the pipeline 60. The valve 10 includes a valve gate 12. Movement of the valve gate 12 will control the opening of a flow pass of the pipeline 60 so as to control amount of fluid flowing through the valve 10. The valve gate 12 is connected to a valve switch 14 in the valve 10 through a stem not shown.

A driver 16 is connected to the valve switch 14. The driver 16 is electrically or pneumatic controlled. The driver 16 serves to control the movement of the valve switch 14 and thus to control the opening of the valve gate 12.

An electric driver is driven by an electromagnetic valve or a motor so that the valve switch 14 can drive the stem so as to control the opening of the valve gate 12 automatically or self-automatically in near field or far field so as to control the flow of fluid flowing through the valve 10.

A position detector 20 is installed in the valve switch 14 for detecting the position of the valve switch 14 with respect to time. The detecting results are transferred to a specific position so as to record the opening of the valve gate with respect to time for controlling the fluid flowing through the valve 10. In general valve design, the valve switch 14 has a resistor (not show). The opening of the valve gate 12 is measured by the resistance of the resistor.

Figure 2:
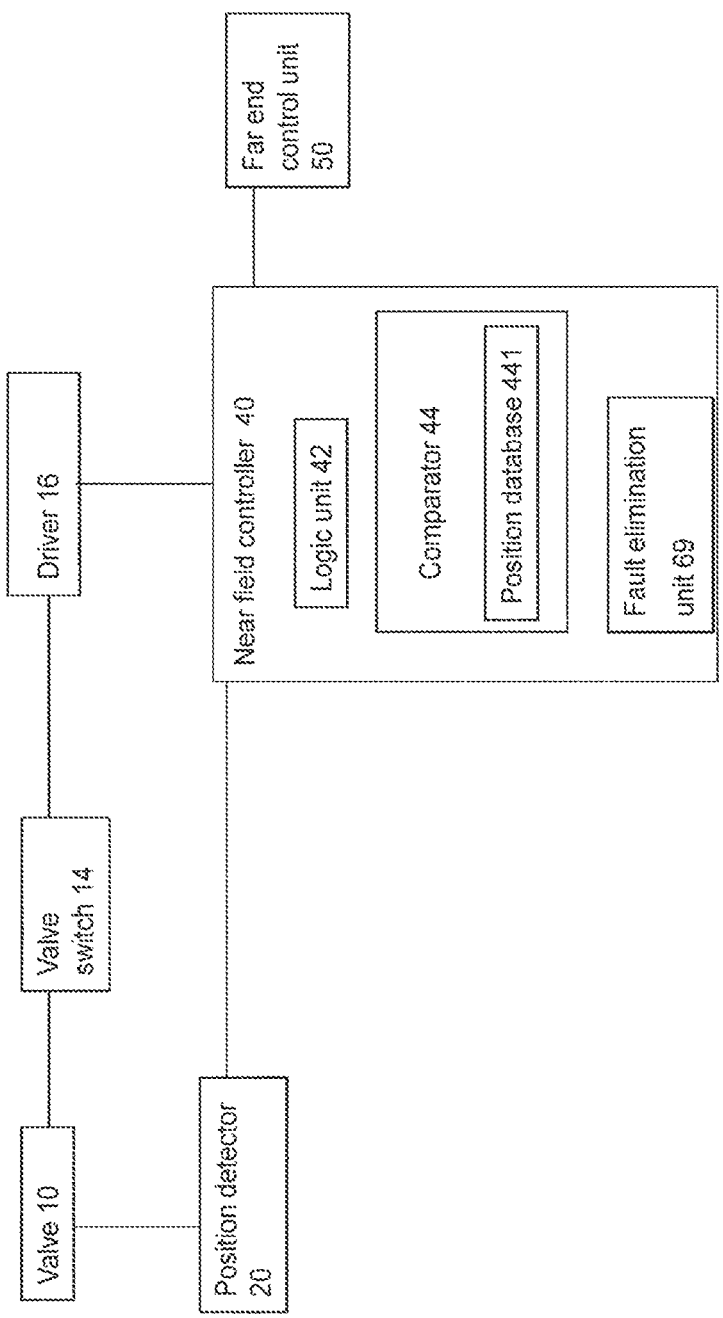
FIG. 2 is a structural block diagram of the present invention.

With reference to FIGS. 1 and 2, the present invention further includes the following elements.

A near field controller 40 is connected to the driver 16 and the position detector 20. The near field controller 40 has a logic unit 42 and a comparator 44.

The logic unit 42 stores rules for determining the state of the valve 10.

The comparator 44 is connected to the logic unit 42. The comparator 44 has a position database 441. For each time that the driver 16 is actuated, the position database 441 records the positions of the valve gate 12 with respect to the time so as to form as a position-time track for the opening of the valve gate 12. The position database 441 also stores standard tracks. The standard track is an ideal track for the positions of the valve gate 12 with respect to opening time, which is built in the position database 441 in advance. The position-time track of the valve gate 12 are recorded as a track based on the positions and the time (referring to FIG. 4). The comparator 44 compares the position-time track of the valve gate 12 with standard tracks recording in the position database 441. The results for the comparisons are recoded and transferred to other related elements of the system.

A far end control unit 50 is installed at a position far away from the valve 10 for receiving data about the valve 10 and emitted from the near field controller 40. The far end control unit 50 is monitored by monitoring members. The members can instruct the near field controller 40 to drive the driver 16 to act.

A fault elimination unit 69 is installed in the near field controller 40. The fault elimination unit 69 stores rules for eliminating of faults about the valve 10 automatically or reporting to the far end monitoring members to do necessary actions.

Figure 3:
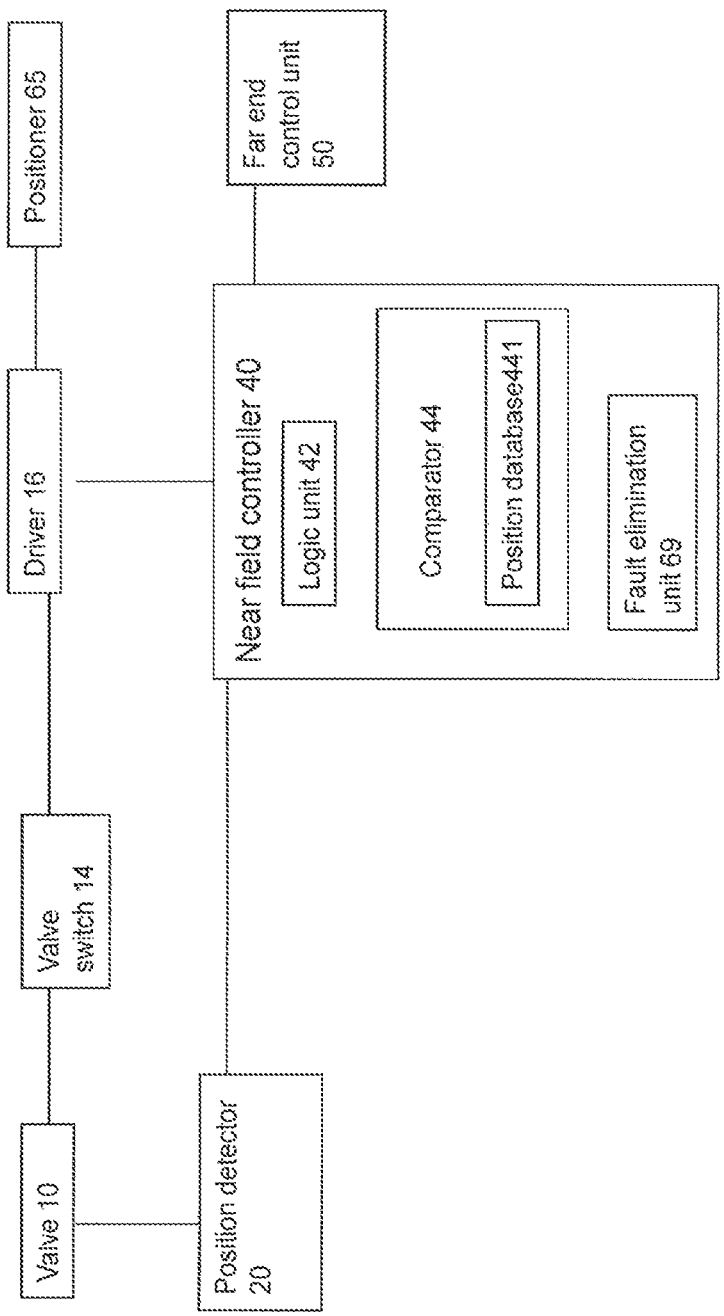
FIG. 3 is another structural block diagram of the present invention.

In FIG. 2, it is illustrated that the structure shown has no positioner. However, with reference to FIG. 3, it is illustrated that in the present invention, the driver 16 can be added with a positioner 65 for assisting the driver 16 to precisely position the opening of the valve gate 12.

The present invention defines three control modes.

In the first control mode, the above mentioned position-time track is used.

Figure 4A:
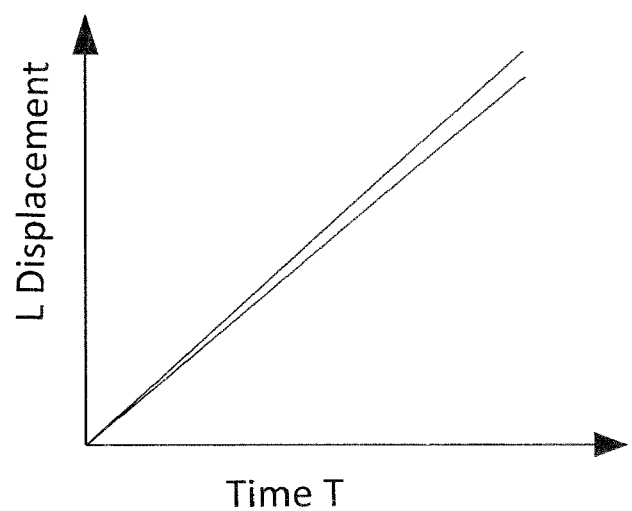
FIGS. 4A to 4E show different tracks about the various faults occurring in a valve.
Figure 4B:
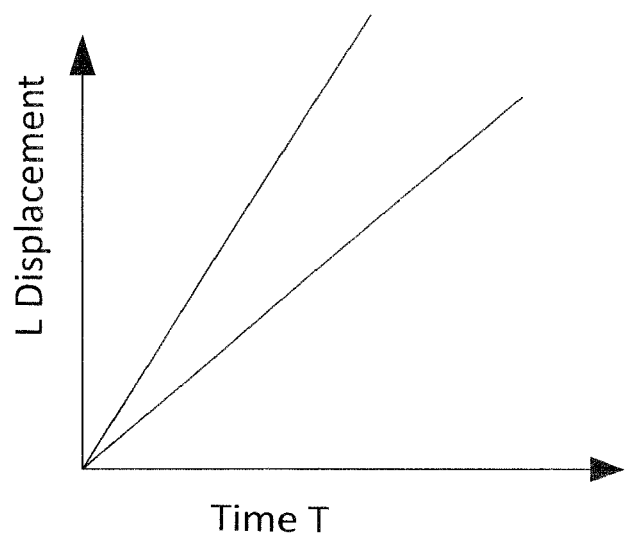

When the driver 16 is actuated, the comparator 44 will compare the position-time track of the valve gate 12 with the standard track so as to determine the state of the valve 10. The difference of the two tracks is used to determine whether the valve 10 is aged or has fault. In fault state, it can determine the extent of the fault. As illustrated in FIG. 4A, it is illustrated that the position-time track of the valve gate 12 is almost like the standard track. Thus, this means that the current state of the valve 10 is good. If the position-time track of the valve gate 12 has a great difference from the standard track as illustrated in FIG. 4B, it means that the valve 10 is aged or is hindered by some other obstacles. The great the difference therebetween, the serious the aged state or the fault. Thus, the near field controller 40 transfers this message to the far end control unit 50.

Figure 4C:
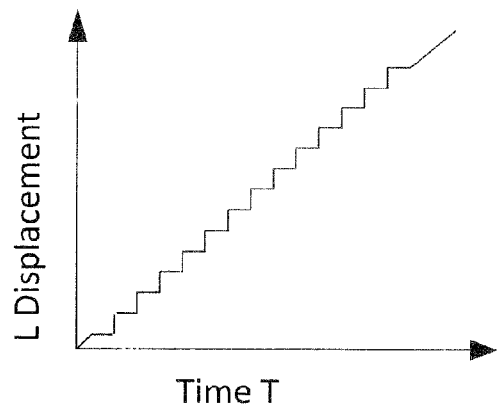
Figure 4D:
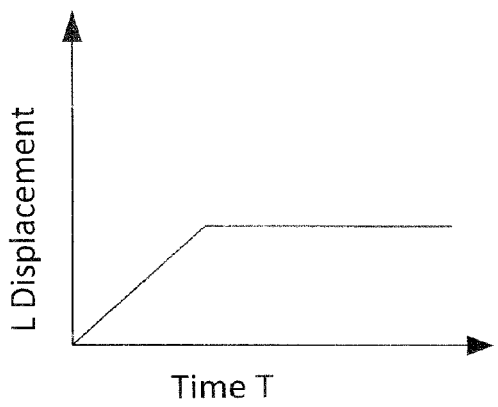
Figure 4E:
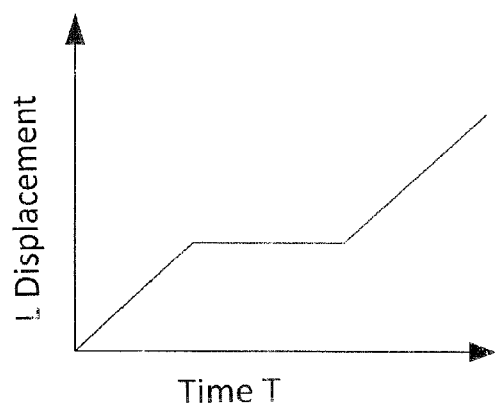

In the second control mode, the logic unit 42 is stored with some rules for determining the states of the valve 10. The near field controller 40 determines the state of the base by using position-time track of the valve gate 12 based on the rules in the logic unit 42. Then if it is determined that fault occurs in the valve 10, the fault elimination unit 69 is used to eliminate faults determined by the logic unit 42. For example, the position-time track of the valve gate 12 detected by the position detector 20 is a trembling line having a plurality of corner portions as illustrated in FIG. 4C, or a cut line having a single corner portion as illustrated in FIG. 4D, or a step line having two corner portions as illustrated in FIG. 4E. The rules in the logic unit 42 considers that the trembling line means that the movement of the valve gate 12 is unstable due to some minor obstacles in the moving path of the valve gate 12. The cut line means that the valve switch 14 is hindered by a large obstacle. The step line means that the valve seat is destroyed. Then these messages are transferred to the far end control unit 50 to inform the monitoring members.

The third operation mode of the present invention is the combination of the first and second operation mode. That is, the comparator 44 compares the position-time track of the valve gate 12 with the standard track so as to determine the state of the valve 10 based on the rules in the logic unit 42. If it is determined that the valve gate 12 is obstructed or hindered by undesired objects, the fault elimination unit 69 will drive the driver 16 to actuate the valve switch 14 for driving the valve gate 12 to rotate repeatedly to eliminate obstruction or rust of the valve 10. Furthermore, the state is reported to the far end control unit 50. The amplitude of the movement of the valve gate 12 is based on the practical requirement. If it is not affect the operation of the whole pipeline, the valve 10 can be operated again for acquiring a new position-time track of the valve gate 12 for determining effect of the fault elimination unit 69.

In the present invention, a near field controller 40 is built nearby the valve so as to monitor the valve switch 14 to get the data about the position-time track of the valve gate which is used to compare with standard tracks. Furthermore, a logic unit has rules for determining the state of the valve. A fault elimination unit is used to eliminate the fault of the valve by movements of the valve gate. Therefore, the present invention provides a near field automatic maintenance and repairing solutions for the control of a valve without actions from far end controlling members. The cost and manpower are saved and the work is done more efficiently.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for controlling a valve apparatus, the valve apparatus comprising a valve, a driver and a position database, the valve being connected with at least one pipeline and having a valve gate, the valve gate being moved to control an opening for a flow of fluid in the pipeline so as to control an amount of the fluid flowing through the valve, the driver controlling movements of the valve gate to control the opening of the valve gate, the method comprising the steps of:
   storing a standard track in the position database, where the standard track is an ideal track for the positions of the valve gate with respect to opening time;
   recording different positions detected by a position detector with respect to time in the position database to form a position-time track for the opening of the valve gate;
   comparing the position-time track with the standard track to find out whether at least one corner portion is shown in the position-time track, with the corner portion indicating that the valve gate encounter obstacles in a moving path; and
   moving the valve gate back and forth for removing the obstacles if the at least one corner portion is shown in the position-time track.

2. The method as claimed in claim 1, wherein the obstacles are rust of the valve or undesired objects.

3. The method as claimed in claim 1, wherein the driver is a pneumatic driver or an electric driver.

4. The method as claimed in claim 1, wherein the driver comprises a positioner used for precise positioning.

5. The method as claimed in claim 1, further comprising: reporting the state of obstruction to a far end control unit.

6. The method as claimed in claim 1, wherein the valve gate is rotated back and forth to remove the obstacles.

7. A method for controlling a valve apparatus, the valve apparatus comprising a valve connected with at least one pipeline, the valve having a valve gate, the valve gate being moved to different positions to control an opening for a flow of fluid in the pipeline so as to control an amount of the fluid flowing through the valve, the method comprising the steps of:

recording different positions detected by a position detector with respect to time to form a position-time track for the opening of the valve gate;

comparing the position-time track with a standard track to detect an abnormal event shown by at least one corner portion in the position-time track where the valve gate encounters obstacles in a moving path, with the standard track being an ideal track for the positions of the valve gate with respect to opening time; and moving the valve gate back and forth in response to the abnormal event to remove the obstacles.

8. The method as claimed in claim 7, wherein the valve gate is rotated back and forth to remove the obstacles.

9. The method as claimed in claim 7, wherein the obstacles are rust of the valve or undesired objects.

10. The method as claimed in claim 7, further comprising: reporting the abnormal event to a far end control unit.

* * * * *